United States Patent

Wallrafen

[11] Patent Number: 5,955,658
[45] Date of Patent: Sep. 21, 1999

[54] DEVICE FOR MEASURING CHANGES IN PRESSURE

[75] Inventor: Werner Wallrafen, Sulzbach, Germany

[73] Assignee: VDO Adolf Schindling AG, Frankfurt, Germany

[21] Appl. No.: 08/846,684

[22] Filed: Apr. 30, 1997

Related U.S. Application Data

[63] Continuation of application No. 08/589,745, Jan. 22, 1996, abandoned.

[51] Int. Cl.$^6$ .................................................... G01M 3/32
[52] U.S. Cl. ........................................................ 73/49.2
[58] Field of Search ........................ 73/49.2 T, 49.2 R, 73/40, 49.7

[56] References Cited

U.S. PATENT DOCUMENTS

| | | | |
|---|---|---|---|
| 4,177,496 | 12/1979 | Bell et al. . | |
| 4,369,661 | 1/1983 | Gibb | 73/755 |
| 5,369,984 | 12/1994 | Rogers et al. | 73/49.2 |
| 5,467,641 | 11/1995 | Williams et al. | 73/49.7 |
| 5,507,176 | 4/1996 | Kammeraad et al. | 73/49.2 |
| 5,509,296 | 4/1996 | Kolb | 73/49.2 X |

FOREIGN PATENT DOCUMENTS

| | | |
|---|---|---|
| 4101554 | 7/1992 | Germany . |
| 4141509 | 7/1992 | Germany . |
| 4203099 | 8/1993 | Germany . |

OTHER PUBLICATIONS

Sensoren (sensors) by Dr. Hanno Schaumburg, B.G. Teubner Stuttgart 1992 pp. 184–187.

*Primary Examiner*—Michael Brock
*Attorney, Agent, or Firm*—Martin A. Farber

[57] ABSTRACT

A device for measuring pressure changes, and preferably for testing the tightness of a fuel tank, wherein a high-pass filter, the time constant of which is greater than the time constant of the pressure changes to be measured and less than the time constant of the pressure changes of the surrounding air, is arranged behind an absolute-pressure sensor pressure in the fuel tank.

10 Claims, 1 Drawing Sheet

DEVICE FOR MEASURING CHANGES IN PRESSURE

RELATED APPLICATION

This application is a continuation of my application U.S. Ser. No. 08/589,745 filed Jan. 22, 1996, now abandoned.

FIELD AND BACKGROUND OF THE INVENTION

The present invention relates to a device for measuring changes in pressure, and preferably for checking the tightness of a fuel tank.

For the continuous testing of fuel tanks with respect to their tightness, methods and devices are known in which, after a decrease in pressure which has been produced for test purposes, the change in pressure, i.e. the rate of change of the pressure, is measured in the fuel tank and evaluated. For this, there is generally used a pressure-difference sensor, such as, for instance, in a process and an apparatus for determining the level of fuel in a tank in accordance with Federal Republic of Germany 42 03 099 A1. In that case, the pressure-difference sensor produces a signal which is analogous to the pressure difference between the pressure within the tank and the outside pressure.

A pressure-difference sensor therefore requires venting to the outside, and in this connection there must be assurance that no liquid enters, such as, for instance, water of condensation. The use of labyrinths, capillaries, and Teflon filters does not constitute absolute protection against this. Furthermore, the fuel could escape if the sensitive membrane of the pressure-difference sensor were to burst.

SUMMARY OF THE INVENTION

It is an object of the present invention to make possible a device for measuring pressure differences, i.e. the rate of change of the pressure, without the use of a pressure difference sensor.

In accordance with the invention, behind the absolute-pressure sensor, there is arranged a high-pass filter the time constant of which is greater than the time constant of the tank pressure changes to be measured and less than the time constant of pressure changes of the atmosphere.

In addition to the advantage that the above-indicated disadvantages inherent in a pressure-difference sensor are avoided, the invention has the advantage that no compensation for zero-point drift is necessary. In particular, in measurement ranges within the millibar range, this zero-point drift in pressure sensors is very critical and disturbing.

Although the device of the invention is intended primarily for use in fuel tanks of motor vehicles, its use also together with other containers in which pressure-difference sensors are still used may also be advantageous.

The absolute pressure is frequently substantially greater than the changes in pressure to be detected. Thus, for instance, in the case of the above-mentioned tank-tightness testing, the changes in pressure are within the region of ±50 mbar, which results in a relatively small useful signal as compared with the change in atmospheric air pressure. Therefore, in accordance with a further development, it is advantageous to have the high-pass filter connected on its input side to the absolute-pressure sensor without the interpositioning of an amplifier, and on its output side to an amplifier.

In order to obtain the time constants necessary for the device in accordance with the invention, it is advantageous for the high-pass filter to be developed as an active filter.

BRIEF DESCRIPTION OF THE DRAWINGS

With the above and other objects and other advantages in view, the present invention will become more clearly understood in connection with the detailed description of a preferred embodiment, when considered with the accompanying drawings of which.

DETAILED DESCRIPTION OF THE PREFERRED EMBODIMENT

Figure 1:
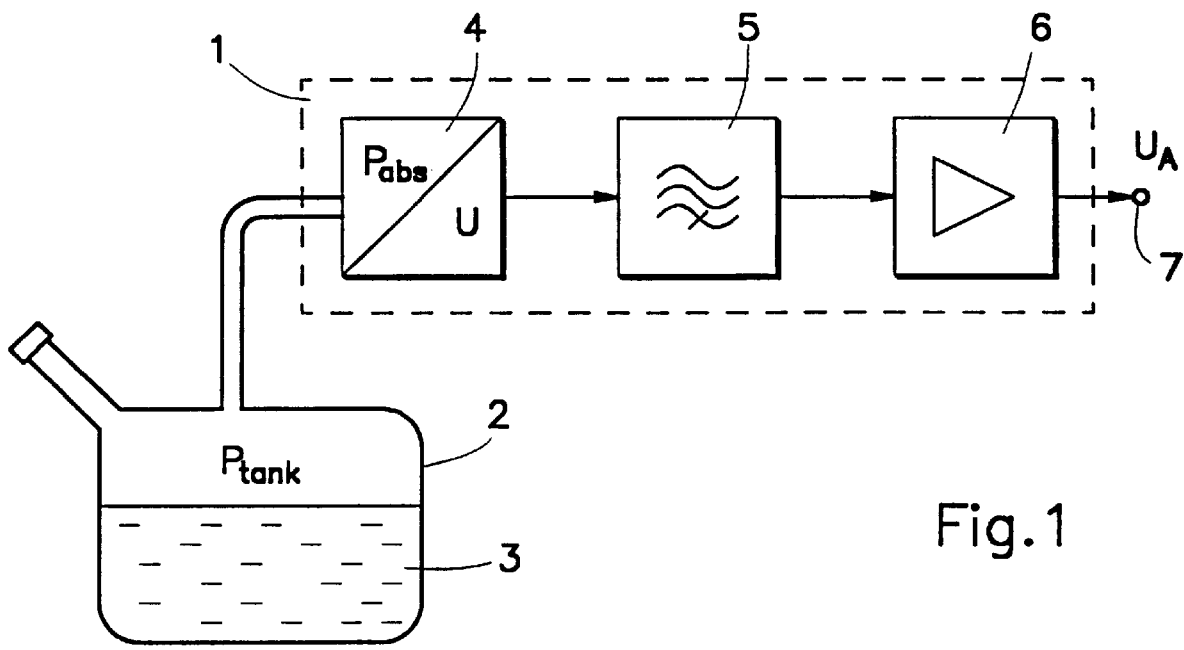
FIG. 1 is a diagrammatic showing of a device in accordance with the invention.
Figure 2:
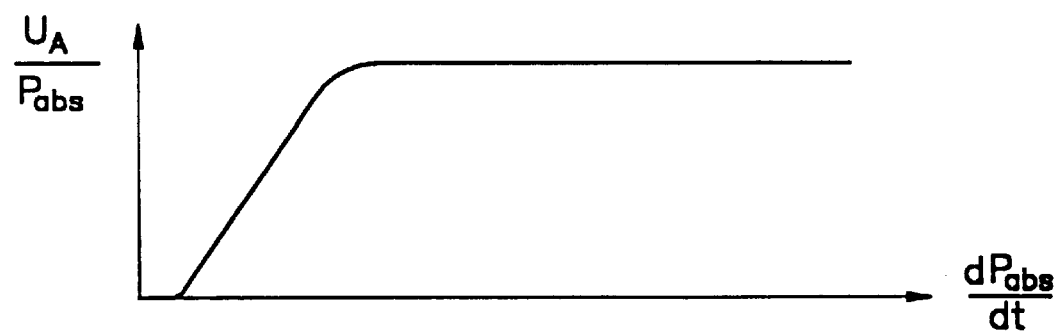
FIG. 2 shows a characteristic curve of the high-pass filter.

FIG. 1 shows, in addition to a device 1 in accordance with the invention, a tank 2 which is partially filled with a liquid 3, for instance fuel. An absolute-pressure sensor 4 is connected to the inside of the tank 2 and gives off a voltage U which is analogous to the absolute pressure $P_{abs}$. This voltage is conducted over a high-pass filter 5 and an amplifier 6. The output voltage $U_A$ at the output 7 is a measure of the tank pressure $P_{tank}$ when the pressure $P_{abs}$ changes sufficiently rapidly, i.e. if $dP_{abs}/dt$ is sufficiently large and is therefore in the horizontal region of the characteristic curve shown in FIG. 2.

I claim:

1. A device for measuring pressure changes, the device being suitable for testing a fuel tank for tightness, the device comprising:

an absolute pressure sensor and a high-pass filter;

wherein the sensor senses pressure within the tank to provide measurements of pressures within the tank;

wherein the high-pass filter is connected behind the pressure sensor and has a time constant which is greater than a time constant of the pressure changes to be measured in the tank, and less than a time constant of pressure changes of the surrounding air.

2. A device according to claim 1, further comprising an amplifier, and wherein the high-pass filter is connected on its input side directly, and without interposition of an amplifier, to the absolute-pressure sensor, the filter being connected on its output side to the amplifier.

3. A device according to claim 1, wherein, the high-pass filter is an active filter.

4. A device according to claim 1, wherein said absolute pressure sensor and said high pass-filter constitute a unit.

5. A device according to claim 4, further comprising a housing enclosing said absolute pressure sensor and said high-pass filter.

6. A device for measuring pressure changes, the device being suitable for testing a fuel tank for tightness, the device comprising:

an absolute pressure sensor and a high-pass filter;

wherein the sensor senses pressure within the tank to provide measurements of pressure within the tank, the pressure measurements of the sensor being isolated from pressure of the atmosphere; and the high-pass filter is connected behind the pressure sensor and has a time constant which is greater than a time constant of the pressure changes to be measured in the tank, and less than a time constant of pressure changes of the surrounding air for detection of rapid pressure changes produced by leaks in the tank while being insensitive to slow pressure changes in the absence of a tank leak.

7. A device according to claim 6, wherein said absolute pressure sensor and said high-pass filter constitute a unit.

8. A device according to claim 7, further comprising a housing enclosing said absolute pressure sensor and said high-pass filter.

9. A method for testing a tank for tightness, comprising steps of:

measuring absolute pressure within the tank to obtain an absolute pressure measurement, said measuring step including an isolating of the pressure measurement from atmospheric pressure; and filtering the pressure measurement to extract pressure changes indicative of a leak in the tank, said filtering employing a high-pass filter and including a step of selecting a value of a time constant of the filter to provide for the filter a time constant which is greater than a time constant of the pressure changes measured in the tank and less than a time constant of pressure changes of the atmosphere.

10. A method according to claim 9, further comprising a step of constructing the pressure sensor and the filter as a unit.

* * * * *